US011501446B2

(12) United States Patent
Chen et al.

(10) Patent No.: US 11,501,446 B2
(45) Date of Patent: Nov. 15, 2022

(54) SEGMENTING 3D INTRACELLULAR STRUCTURES IN MICROSCOPY IMAGES USING AN ITERATIVE DEEP LEARNING WORKFLOW THAT INCORPORATES HUMAN CONTRIBUTIONS

(71) Applicant: Allen Institute, Seattle, WA (US)

(72) Inventors: Jianxu Chen, Shoreline, WA (US);
Liya Ding, Newcastle, WA (US);
Matheus Palhares Viana, Seattle, WA (US); Susanne Marie Rafelski, Seattle, WA (US)

(73) Assignee: Allen Institute, Seattle, WA (US)

( * ) Notice: Subject to any disclaimer, the term of this patent is extended or adjusted under 35 U.S.C. 154(b) by 156 days.

(21) Appl. No.: 16/669,089

(22) Filed: Oct. 30, 2019

(65) Prior Publication Data

US 2020/0134831 A1    Apr. 30, 2020

Related U.S. Application Data

(60) Provisional application No. 62/775,775, filed on Dec. 15, 2018, provisional application No. 62/752,878, filed on Oct. 30, 2018.

(51) Int. Cl.
*G06T 7/10*        (2017.01)
*G06T 7/13*        (2017.01)
(Continued)

(52) U.S. Cl.
CPC .............. *G06T 7/13* (2017.01); *G06N 3/0454* (2013.01); *G06N 3/08* (2013.01); *G06T 7/0012* (2013.01);
(Continued)

(58) Field of Classification Search
CPC ........ G06N 3/0454; G06T 2207/20084; G06T 7/0012; G06T 7/11; G06T 2207/20092;
(Continued)

(56) References Cited

U.S. PATENT DOCUMENTS 8,214,157 B2 *  7/2012  Moser .................. G06K 9/6298
                                                702/19
8,942,423 B2 *  1/2015  Patwardhan .......... G06T 7/0012
                                                382/209
(Continued)

OTHER PUBLICATIONS

Gonda et al., "An Interactive Deep Learning Toolkit for Automatic Segmentation of Images," Master's thesis, Harvard Extension School, May 2016, 82 pages.

(Continued)

*Primary Examiner* — Tsung Yin Tsai
(74) *Attorney, Agent, or Firm* — Seed IP Law Group LLP

(57) ABSTRACT

A facility for identifying the boundaries of 3-dimensional structures in 3-dimensional images is described. For each of multiple 3-dimensional images, the facility receives results of a first attempt to identify boundaries of structures in the 3-dimensional image, and causes the results of the first attempt to be presented to a person. For each of a number of 3-dimensional images, the facility receives input generated by the person providing feedback on the results of the first attempt. The facility then uses the following to train a deep-learning network to identify boundaries of 3-dimensional structures in 3-dimensional images: at least a portion of the plurality of 3-dimensional images, at least a portion of the received results, and at least a portion of provided feedback.

18 Claims, 9 Drawing Sheets

(51) Int. Cl.
  *G06N 3/08* (2006.01)
  *G06N 3/04* (2006.01)
  *G06T 7/00* (2017.01)
  *G06V 10/20* (2022.01)
(52) U.S. Cl.
  CPC .............. *G06T 7/10* (2017.01); *G06V 10/20* (2022.01); *G06T 2207/10012* (2013.01); *G06T 2207/20081* (2013.01); *G06T 2207/20084* (2013.01); *G06T 2207/30024* (2013.01); *G06V 2201/03* (2022.01)
(58) Field of Classification Search
  CPC ........ G06T 7/10; G06V 10/20; G06V 20/695; G16H 30/20
  See application file for complete search history.

(56) References Cited

U.S. PATENT DOCUMENTS

| | | | | |
|---|---|---|---|---|
| 9,684,960 | B2 * | 6/2017 | Buzaglo | G06F 16/51 |
| 10,109,052 | B2 * | 10/2018 | Chefd'hotel | G06T 7/0012 |
| 10,643,331 | B2 * | 5/2020 | Ghesu | G06T 7/187 |
| 2006/0039593 | A1 * | 2/2006 | Sammak | G06K 9/6269 382/160 |
| 2009/0307248 | A1 * | 12/2009 | Moser | G06F 16/22 |
| 2013/0267846 | A1 * | 10/2013 | Patwardhan | G06T 7/0012 600/407 |
| 2015/0213599 | A1 * | 7/2015 | Buzaglo | G06V 20/695 382/128 |
| 2017/0169567 | A1 * | 6/2017 | Chefd'hotel | G06N 3/0454 |
| 2018/0075279 | A1 * | 3/2018 | Gertych | G01N 33/5011 |
| 2018/0218497 | A1 * | 8/2018 | Golden | G06T 7/143 |
| 2018/0286038 | A1 | 10/2018 | Jalali et al. | |
| 2019/0258846 | A1 * | 8/2019 | Dinov | G01N 1/30 |
| 2019/0272638 | A1 * | 9/2019 | Mouton | G06V 20/698 |
| 2020/0027559 | A1 * | 1/2020 | Baker | G16H 30/40 |
| 2020/0074664 | A1 * | 3/2020 | Weber | G06T 17/00 |
| 2020/0134831 | A1 * | 4/2020 | Chen | G06V 20/64 |

OTHER PUBLICATIONS

International Search Report dated Feb. 26, 2020, for International Application No. PCT/US2019/058894, 3 pages.
Shen et al., "Multi-stage Multi-recursive-input Fully Convolutional Networks for Neuronal Boundary Detection," IEEE International Conference on Computer Vision (ICCV), pp. 2391-2400, 2017.
Arganda-Carreras, et al., "Trainable weak segmentation: a machine learning tool for microscopy pixel classification", *Bioinformatics*, 2017, vol. 33(15), pp. 2424-2426.
Bukowiecki, et al., "Mitochondrial function in pluripotent stem cells and cellular reprogramming", *Gerontology*, 2014, vol. 60(2), pp. 174-182.
Carpenter, et al., "Cellprofiler: image analysis software for identifying and quantifying cell phenotypes", *Genome Biology*, 2006, vol. 7(10), R100, 11 pages.
Chen, et al., "Deep contextual networks for neuronal structure segmentation", *AAAI Conference on Artificial Intelligence*, 2016, pp. 1167-1173.
Chen, et al., "Combining fully convolutional and recurrent neural networks for 3D biomedical image segmentation", *Advances in Neural Information Processing Systems*, 2016, 9 pages.
Chen, et al., "Neuron segmentation using deep complete bipartite networks", *International Conference on Medical Image Computing and Computer-Assisted Intervention*, 2017, 10 pages.
Çiçek, et al., "3D U-Net: learning dense volumetric segmentation from sparse annotation", *International Conference on Medical Image Computing and Computer-Assisted Intervention*, 2016, 8 pages.
De Chaumont, et al., "Icy: an open bioimage informatics platform for extended reproducible research", *Nature Methods*, 2012, vol. 9(7), pp. 690-696.
Drvision, *Aivia Cloud—AI Microscopy for Everyone*, retrieved Nov. 8, 2018, from https://www.drvtechnologies.com/aivia-cloud, 5 pages.
Frangi, et al., "Multiscale vessel enhancement filtering", *International Conference on Medical Image Computing and Computer-Assisted Intervention*, 1998, pp. 130-137.
Gan, et al., "Vimentin intermediate filaments template microtubule networks to enhance persistence in cell polarity and directed migration", *Cell Systems*, 2016, 3(3), pp. 252-263.
Gibson, et al., "NiftyNet: a deep-learning platform for medical imaging", *Computer Methods and Programs in Biomedicine*, vol. 158, 2018, pp. 113-122.
Haupt, et al., "Endogenous protein tagging in human induced pluripotent stem cells using CRISPR/Cas9", *Journal of Visualized Experiments: JoVE*, 2018, 138, pp. 1-9.
Hodneland, et al., "CellSegm-a MATLAB toolbox for high-throughput 3d cell segmentation", *Source Code for Biology and Medicine*, 8(16), 2016, pp. 1-24.
Jerman, et al., "Enhancement of vascular structures in 3d and 2d angiographic images", *IEEE Transactions on Medical Imaging*, 2016, vol. 35(9), pp. 2107-2118.
Kervrann, et al., "A guided tour of selected image processing and analysis methods for fluorescence and electron microscopy", *IEEE Journal of Selected Topics in Signal Processing*, 2016, vol. 10(1), pp. 6-30.
Kingma, et al., "Adam: A method for stochastic optimization", *arXiv preprint*, 2014, arXiv:1412.6980, pp. 1-15.
Long, et al., "Fully convolutional networks for semantic segmentation", *IEEE Conference on Computer Vision and Pattern Recognition*, 2015, 10 pages.
McQuin, et al., "Cellprofiler 3.0: Nextgeneration image processing for biology", *PLoS Biology*, 2018, vol. 16 (7), e2005970, 17 pages.
Neila, et al., "A fast method for the segmentation of synaptic junctions and mitochondria in serial electron microscopic images of the brain", *Neuroinformatics*, 2016, vol. 14(2), pp. 235-250.
Niclis, et al., "Three-dimensional imaging of human stem cells using soft X-ray Tomography", *Journal of the Royal Society Interface*, 2015, vol. 12(108), 20150252, 11 pages.
Pawlowski, et al., "Dltk: State of the art reference implementations for deep learning on medical images", *arXiv preprint*, 2017, arXiv:1711.06853, 4 pages.
Perona, et al., "Scale-space and edge detection using anisotropic diffusion", *IEEE Transactions on Pattern Analysis and Machine Intelligence*, 1990, vol. 12(7), pp. 629-639.
Rafelski, et al., "Mitochondrial network size scaling in budding yeast", *Science*, 2012, vol. 338(6108), 9 pages.
Roberts, et al., "Systematic gene tagging using CRISPR/Cas9 in human stem cells to illuminate cell organization", *Molecular Biology of the Cell*, 2017, vol. 28(21), pp. 2854-2874.
Roberts, et al., "Scarless gene tagging of transcriptionally silent genes in hiPSCs to visualize cardiomyocyte sarcomeres in live cells", *bioRxiv*, 2018, 342881, 35 pages.
Schindelin, et al., "Fiji: an open-source platform for biological-image analysis", *Nature Methods*, 2012, vol. 9(7), 676, 15 pages.
Schlimmer, et al., "A case study of incremental concept Induction", *Proceedings of the Fifth AAAI Conference on Artificial Intelligence*, 1986, pp. 496-501.
Smith, et al., "Smash-semi-automatic muscle analysis using segmentation of histology: a matlab application", *Skeletal Muscle*, 2014, vol. 4(1), 21, 16 pages.
Sommer, et al., "Ilastik: Interactive learning and segmentation toolkit", *IEEE International Symposium on Biomedical Imaging: From Nano to Macro*, 2011, vol. 2(5), 8, 9 pages.
Ulman, et al., "An objective comparison of cell-tracking algorithms", *Nature Methods*, 2017, vol. 14(12), pp. 1141-1152.
Yushkevich, et al., "User-guided 3D active contour segmentation of anatomical structures: Significantly improved efficiency and reliability", *Neuroimage*, 2006, vol. 31(3), pp. 1116-1128.
Chen, J., et al., "The Allen Cell Structure Segmenter: a new open source toolkit for segmenting 3D intracellular structures in fluorescence microscopy images," Dec. 8, 2018, retrieved from https://www.biorxiv.org/content/10.1101/491035v1, 27 pages.

(56) References Cited

OTHER PUBLICATIONS

Ihle, S., et al., "Unsupervised data to content transformation with histogram-matching cycle-consistent generative adversarial networks," Aug. 8, 2019, retrieved from https://doi.org/10.1038/s42256-019-0096-2, 23 pages.

Johnson, G., et al., "Generative Modeling with Conditional Autoencoders: Building an Integrated Cell," Apr. 28, 2017, retrieved from arXiv:1705.00092v1, 16 pages.

Ounkomol, C., et al., "Label-free prediction of three-dimensional fluorescence images from transmitted light microscopy," Nat Methods. Author manuscript; available in PMC Mar. 17, 2019, 13 pages.

Ren, S., et al., "Faster R-CNN: Towards Real-Time Object Detection with Region Proposal Networks," Jan. 6, 2016, retrieved from arXiv:1506.01497v3, 14 pages.

Gaur et al., "Membrane Segmentation via Active Learning with Deep Networks," ICIP 2016, pp. 1943-1947.

\* cited by examiner

SEGMENTING 3D INTRACELLULAR STRUCTURES IN MICROSCOPY IMAGES USING AN ITERATIVE DEEP LEARNING WORKFLOW THAT INCORPORATES HUMAN CONTRIBUTIONS

CROSS-REFERENCE TO RELATED APPLICATIONS

This application claims the benefit of U.S. Patent Application No. 62/752,878, filed Oct. 30, 2018 and entitled "SEGMENTING 3D INTRACELLULAR STRUCTURES IN MICROSCOPY IMAGES USING AN ITERATIVE DEEP LEARNING WORKFLOW THAT INCORPORATES HUMAN CONTRIBUTIONS," and U.S. Patent Application No. 62/775,775, filed Dec. 5, 2018, and entitled "SEGMENTING 3D INTRACELLULAR STRUCTURES IN MICROSCOPY IMAGES USING AN ITERATIVE DEEP LEARNING WORKFLOW THAT INCORPORATES HUMAN CONTRIBUTIONS," each of which is hereby incorporated by reference in its entirety.

In cases where the present application conflicts with a document incorporated by reference, the present application controls.

BACKGROUND

Modern microscopy techniques have revolutionized microscopic imaging of tissues, cells, subcellular structures, and proteins in vitro and in vivo. Such techniques can generate different types of multi-dimensional image data (3D, timelapse, multiple imaging channels, or combinations thereof, etc.), which are then available for further analysis with a range of qualitative and quantitative approaches. Qualitative analyses often include visual inspection of small sets of image data, which are very useful to rapidly assess general image quality or to compare gross differences between experimental conditions. These observations can be tallied to provide numbers for statistical trends within the data. Quantitative and automated analysis approaches are particularly helpful when the number of images to examine is large, the differences between experimental conditions are too subtle or complex for consistent manual scoring, or the image data and its interpretation are intended to be used to develop data-driven models. Quantitative analysis of image data involves applying image processing algorithms to extract numbers from a microscope image that permit meaningful interpretations of biological experiments, both in a comparative and an absolute manner.

To directly extract interpretable measurements of an object within an image, the object to be measured needs to be identified such that every pixel (or voxel) is either part or not part of that object. This step of identifying, or segmenting out, an object from its surroundings enables measuring the size and shape of each object, counting the number of objects, or measuring intensity counts within a given object. Accurate and robust image segmentation, object detection, and appropriate validation are thus important to quantitative image analysis.

DETAILED DESCRIPTION

Figure 1:
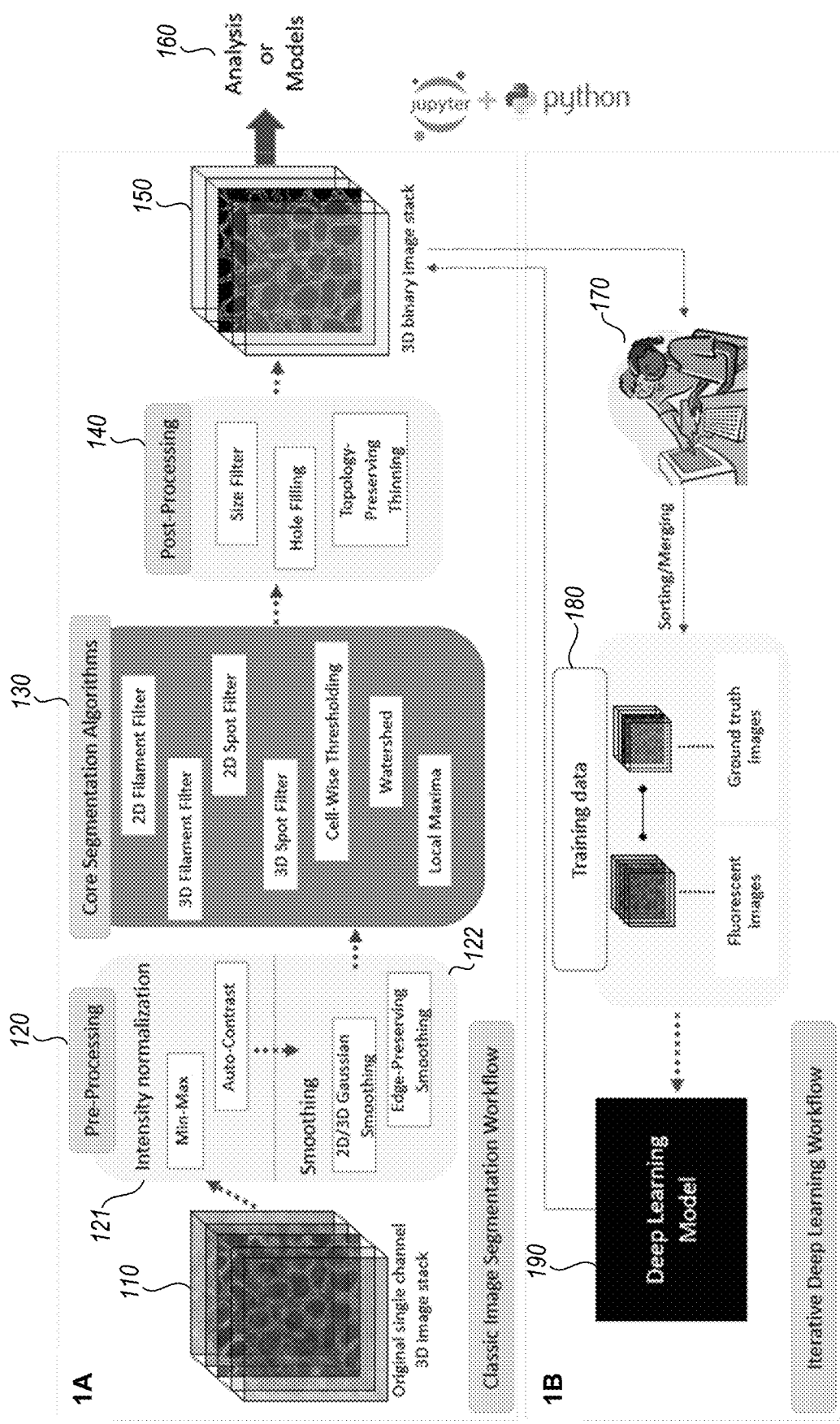
FIG. 1 is a data flow diagram that shows an overview of the facility.

The inventors have recognized significant disadvantages in existing 3D image segmentation methods, which can be categorized as classic image processing algorithms, traditional machine learning, and deep learning methods. Classic image processing algorithms are most widely used by the cell biological research community and are accessible in two main ways. Some algorithms are available as a collection of basic functions in several open platforms. However, basic functions in general open platforms are sometimes not sufficient to obtain optimal results. For example, the Frangi vesselness filter has been widely used as the default method for segmenting filament-like structures. A recent variant of the Frangi filter significantly improves segmentation accuracy, especially for filaments of different intensities or interlaced filaments. Other published algorithms are designed for a specific structure in a specific imaging modality, and are typically implemented and released individually. Compared to general image processing platforms, such tools are less widely applicable and often much less convenient to apply.

Alternatively, traditional machine learning algorithms are sometimes used to facilitate segmentation from microscope images. These include random forests and support vector machines, which have been integrated into certain tools. Users simply paint on selective pixels/voxels as foreground and background samples. A traditional machine learning model is automatically trained and then applied on all images to predict the painted pixels or voxels. These tools are limited by the effectiveness of the traditional machine models. For problems where classic image processing methods and traditional machine learning algorithms don't generate accurate segmentation, deep learning based 3D segmentation methods have achieved significant success. The inventors have recognized two factors that hinder biologists from leveraging the power of deep learning to solve 3D microscopy image segmentation problems: preparing 3D ground truths for model training, and access to convenient tools for building and deploying these deep learning models. Existing tools, such as those for medical images, mostly focus on quickly applying deep learning knowledge to solve the problem. This is still hard for people without sufficient experience in deep learning and computer vision. Other tools may be easy to use for everyone, but generating the ground truths needed to train them is often very difficult. 'Manual painting' has been widely used for generating ground truths for 2D segmentation problems. However, generating 3D ground truth images via 'manual painting' quickly becomes prohibitive both because it is so very time consuming and inherently difficult. For example, while it can be easy to delineate the nucleus boundary in a 2D image, it is often difficult to paint the "shell" of nucleus in 3D. It is often even more challenging for structures with more complex shape than nuclei.

In response to identifying these disadvantages of conventional approaches to 3D image segmentation, the inventors have conceived and reduced to practice a software and/or hardware facility for 3D image segmentation that begins with a classical segmentation workflow, then uses its results as a basis for an iterative deep learning workflow that incorporates human contributions ("the facility").

The Allen Institute for Cell Science is developing a state space of stem cell structural signatures to understand the principles by which cells reorganize as they traverse the cell cycle and differentiate. To do this, the inventors have developed a pipeline that generates high-replicate, dynamic image data on cell organization and activities in a collection of 20 endogenous fluorescently tagged human induced pluripotent stem cell (hiPSC) lines (Allen Cell Collection; www.allencell.org). Many lines express a monoallelic EGFP-tagged protein that represents a particular cellular structure. To enable quantitative image and data analyses, development of data-driven models, and novel computational approaches, the inventors faced the challenge of developing accurate and robust segmentations for over 30 structures in 3D. Through the inventors' experiences of developing and testing a diverse set of traditional segmentation algorithms on such a large number of distinct intracellular structures, the inventors created a classic image processing workflow involving a limited number of classic image processing steps and algorithms that permitted the inventors to rapidly and successfully obtain high quality segmentations of these structures. These segmentations permitted initial analyses of basic morphometric features of these structures including size, number, shape, and location within the cell and form the basis for more complicated feature parameterizations, and are shown in section 1A of FIG. 1 and discussed below. In addition, to the classic image processing workflow, the facility includes a second, iterative deep learning workflow—shown in section 1B of FIG. 1 and discussed below—that takes advantage of these high quality classic segmentation results and apply them as an initial ground truth in an iterative deep learning-based approach to image segmentation to enhance the accuracy and robustness of these segmentations.

In some embodiments, the facility further includes a new toolkit for intracellular structure segmentation of 3D microscope images that makes both workflows easily accessible to a cell biologist wishing to quantify and analyze her own microscope image-based data. The toolkit simplifies and constrains the number of algorithm choices and parameter values within the classic image segmentation workflow part of the toolkit, and takes advantage of the inventors' current segmentation algorithms to create a sort of "look-up table" shown in FIG. 2 and discussed below as a starting point for a wide range of intracellular structures including "point-sources" such as centrioles and desmosomes, tubules such as mitochondria and microtubules. The toolkit further provides users with tools to apply results from the classic segmentation workflow to generate ground truth segmentations for training deep learning models without manual painting and then to iteratively improve those segmentation results. The goal of the toolkit is to make state of the art segmentation methods accessible to a wide range of cell biological researchers and applicable to a wide range of intracellular structure segmentation problems.

In various embodiments, the facility is applicable to a variety of other image segmentation applications. In some embodiments, the toolkit seamlessly integrates a classic image segmentation workflow and an iterative deep learning workflow to streamline the segmentation process. The classic image segmentation workflow is based on a number of selectable algorithms with tunable parameters, and applies to over 30 different intracellular structures. In the iterative deep learning workflow of the toolkit, the facility uses two strategies for using human input to generate 3D ground truth images for training a deep-learning system of neural networks without laborious and subjective manual painting in 3D.

FIG. 1 is a data flow diagram that shows an overview of the facility. The classic image segmentation workflow shown in Section 1A consists of three steps and includes a restricted set of image processing algorithm choices and tunable parameters. As is discussed in greater detail below, the classic image segmentation workflow shown in Section 1A involves performing preprocessing step 120 against original single channel 3D image stack 110, then performing core segmentation algorithms 130, then performing post-processing 140 in order to obtain a 3D binary image stack 150 specifying segmentation results.

The iterative deep learning workflow shown in Section 1B is used when the accuracy or robustness of the classic image segmentation workflow is insufficient. Two human-in-the-loop strategies, sorting and merging 170, are iteratively applied to build 3D ground truth training sets 180 from the classic image segmentation workflow results 100 for training deep learning 3D segmentation models 190.

In some embodiments, the facility's training and testing of the deep learning model are specifically customized for cellular structures in 3D microscopy images and implemented as a straight-forward wrapper for cell biologists without experience in deep learning. The classic image segmentation and iterative deep learning workflows complement each other—the classic image segmentation workflow can generate sufficiently accurate segmentations for a wide range of cellular structures for analysis purposes. However, when the accuracy or robustness of the optimal classic image segmentation based segmentations is insufficient, the iterative deep learning workflow can be used to boost segmentation performance. Conversely, the classic segmentation workflow facilitates the application of deep learning models to 3D segmentation by generating an initial ground truth image set for training. By using the two workflows, the facility (1) is applicable to a wide range of structures, (2) achieves state-of-the-art accuracy, and (3) is easy for cell biological researchers to use.

The challenge of designing classic image segmentation algorithms over 30 different intracellular structures led to a simple 3-step workflow including a minimal set of image processing algorithm choices and with very few tunable parameters to effectively and efficiently segment a wide range of different cellular structures. In some embodiments, the classic image segmentation workflow begins with a two-part pre-processing step 120, intensity normalization 121 and smoothing 122, followed by the core segmentation algorithms 130, and finally a post-processing step 140.

Data Collection

In various embodiments, the facility collects image data for segmentation based on gene-edited, human induced pluripotent stem cells (hiPSCs) in both the undifferentiated stem cell and hiPSC-derived cardiomyocytes in accordance with some or all of the following details: CRISPR/Cas9 is used to introduce mEGFP and mTagRFPT tags to proteins localizing to known intracellular structures. Clonal, FP-tagged lines are generated for each intracellular structure of interest and used in imaging experiments in which undifferentiated hiPS cells were labeled with membrane dye (CellMask Deep Red) and DNA dye (NucBlue Live) to mark cell boundaries and the nucleus (see the SOP at allencell.org). Edited hiPSC cell lines are differentiated into cardiomyocytes using a small-molecule protocol. For imaging, cells are plated onto glass bottom plates coated with matrigel for undifferentiated hiPS cells and polyethyleneimine and laminin for cardiomyocytes (see SOPs at allencell.org), respectively and imaged using a ZEISS spinning-disk microscope with a 100×/1.25 Objective C-Apochromat W Corr M27, a CSU-X1 Yokogawa spinning-disk head or a 40×/1.2 NA W C-Apochromat Korr UV Vis IR objective, and Hamamatsu Orca Flash 4.0 camera. Imaging settings are optimized for Nyquist sampling. Voxel sizes are 0.108 μm×0.108 μm×0.290 μm in x, y, and z, respectively, for 100×, hiPSC images and 0.128 μm×0.128 μm×0.290 μm in x, y, and z, respectively, for 40×, cardiomyocyte images. The mEGFP-tagged Tom20 line is transfected with mCherry-Mito-7 construct (Michael Davidson, addgene #55102) using 6 μl per well of transfection mixture containing 25 μl Opti-MEM (ThermoFisher #31985-070), 1.5 μl GeneJuice (Millipore #70967) and 1 ug endotoxin free plasmid. Transfected cells are imaged the next day on a ZEISS spinning disk confocal microscope as above. All channels are acquired at each z-step.

Classic Segmentation

The steps of the classic image segmentation workflow include a restricted set of image processing algorithm choices and tunable parameters to effectively segment a wide range of structure localization patterns. The classic image segmentation workflow begins with a two-part pre-processing step, intensity normalization and smoothing, followed by the core segmentation algorithms, and ends with a post-processing step.

Step 1: Pre-Processing

This step consists of intensity normalization and smoothing, which are applied to the original 3D microscopy images in order to prepare the images for the core segmentation algorithms step, which performs the segmentation. The facility bases the choice of algorithm and parameters within the pre-processing step on the morphology of the cellular structure. The purpose of intensity normalization is to make the segmentation robust to different imaging inconsistencies, including microscopy artifacts, debris from dead cells, etc., such that the same structures in different sets of images tend to have similar values above background when fed into the core algorithms. In some embodiments, two intensity normalization algorithms are included in the pre-processing step. Min-Max normalization transforms the full range of intensity values within the stack into the range from zero to one. Auto-Contrast normalization adjusts the image contrast by suppressing extremely low/high intensities. To do this, the facility first estimates the mean and standard deviation (std) of intensity by fitting a Gaussian distribution on the whole stack intensity profile. Then, the full intensity range is cutoff to the range [mean−a×std, mean+b×std], and then normalized to [0, 1]. The parameters, a and b, can be computed automatically based on a couple of typical images and can be user-defined. The purpose is to enhance the contrast, and also reduce the impact from unexpected imaging artifacts or dead cells. In general, Auto-Contrast is the facility's default normalization operation. Min-Max normalization is used when the voxels with highest intensities are the key target in the structure and should not be suppressed. For example, in "point-source" structures, such as centrosomes, the voxels with highest intensities usually reside in the center of centrosomes, which are the important for locating centrosomes.

The purpose of smoothing is to reduce any background noise from the microscopy or other sources and improve segmentation performance. In some embodiments, there are three different smoothing operations included in the pre-processing step, 3D Gaussian smoothing, slice by slice 2D Gaussian smoothing, and edge-preserving smoothing. In most cases 3D Gaussian smoothing works well to reducing image background noise. However, if the target structure consists of dense filaments, an edge-preserving smoothing operation can be more effective. Finally, in some embodiments, the facility uses a slice-by-slice 2D Gaussian smoothing when the movement of the cellular structure is faster than the time interval between consecutive z-slices during 3D live imaging. In this situation, 3D smoothing may further aggravate the subtle shift of the structure in consecutive z-slices.

Step 2: Core Segmentation Algorithms

The core of the classic image segmentation workflow is a collection of algorithms for segmenting objects with different morphological characteristics. This core segmentation algorithm step takes in the pre-processed 3D image stack and generates a preliminary segmentation as input into the post-processing step. The best segmentation workflow for a specific cellular structure may consist of just one of the algorithms or it may involve a sequence of multiple core algorithms. The core segmentation algorithms can be roughly grouped into three categories, based on the morphological characteristics of the target structure. 2D and 3D filament filters (identified as F2 and F3) are suitable for structures with curvi-linear shape in each 2D frame (such as Sec61 beta) or filamentous shape in 3D (such as Alpha Tubulin). 2D and 3D spot filters (S2 and S3) employ Laplacian of Gaussian operations to detect distinct spot-like localization patterns. The "point-source" Desmoplakin localization pattern, exhibits as a round and fluorescence-filled shape in 3D. The "point-source" Desmoplakin localization pattern, exhibits as a round and fluorescence-filled shape in 3D. The S3 filter is more accurate for Desmoplakin than the S2 filter, which stretches filled, round objects in the z-direction. For structures with a more general spotted appearance within each 2D frame instead of separate round structures (e.g., Fibrillarin vs. Desmoplakin), the S3 filter may fail to detect obvious structures while the S2 filter performs much better. The core watershed algorithm (W) can be used in two different ways. First, watershed can be applied to distance transformations of S3 filter results using local maxima as seeds to further separate proximal structures. Second, watershed can also be directly applied to the pre-processed image with seeds (detected by another algorithm) to segment structures enclosed in fluorescent shells (e.g., Lamin B1). The last core segmentation algorithm, masked-object thresholding (MO) is designed for intracellular structure patterns with varying granularity or intensity (e.g., Nucleophosmin). The MO threshold algorithm first applies an automated global threshold to generate a pre-segmentation result, which is used as a mask to permit an Otsu threshold to be applied within each pre-segmentation object. For example, the Nucleophosmin localization pattern includes a primary localization to the granular component of the nucleolus and a weaker, secondary localization to other parts of both the nucleolus and nucleus. Therefore, the facility first applies a relatively low global threshold to roughly segment each nucleus. The facility next computes a local threshold within individual nuclei to segment the nucleophosmin pattern. Compared to traditional global thresholding, masked-object thresholding performs more robustly to variations in intensity of the nucleophosmin localization pattern in different nuclei within the same image.

Step 3: Post-Processing

In some embodiments, three different algorithms are available for the final post-processing step in the workflow. These refine the preliminary segmentation result to make the final segmentation. Not all post-processing algorithms are needed for every structure. The first post-processing algorithm is a morphological hole-filling algorithm (HF) that can resolve incorrect holes that may have appeared in certain segmented objects to represent the target structure more accurately. Second, a straight-forward size filter (S) can be used to remove unreasonably small or large objects from the core segmentation algorithm result. Finally, a specialized topology preserving thinning operation (TT) can be applied to refine the preliminary segmentation without changing the topology (e.g., breaking any continuous but thin structures). This thinning is accomplished by first skeletonizing the preliminary segmentation, then eroding the segmentation in 3D on all voxels that are not themselves within a certain distance from the skeleton.

The inventors used the facility to apply the classic image segmentation workflow to 3D images of over 30 fluorescently tagged proteins, each representing different intracellular structures. Structures were imaged in two different cell types, the undifferentiated hiPS cell and the hiPSC-derived cardiomyocyte. The tagged proteins representing these structures exhibited different expression levels and localization patterns in these two cell types.

Certain structures also varied in their localization patterns in a cell cycle-dependent manner. Together, this led to over 30 distinct intracellular structure localization patterns, which the inventors used to develop and test the classic image segmentation workflow. A significant decision point for any segmentation task is the targeted level of accuracy, which is a function of several factors including the size of the structure, the limits of resolution and detection for that structure, the goal of the subsequent analysis and the amount of effort required to obtain any given target accuracy. In general, for examples examined here the inventors aimed to be consistent with observations in the literature about the structure and obtain a segmentation that could be used for 3D visualization. For example, in some embodiments, the facility's segmentation of microtubules does not use biophysically-informed parameters such as tubule stiffness or branching behavior, nor does it distinguish individual tubules, unlike other, more sophisticated algorithms. However, the tubulin segmentation workflow is sufficient to describe where the microtubules primarily localize and detailed enough to generate a reasonable 3D visualization based on this segmentation.

Visual assessment of where a relatively accurate boundary should be for a given structure can be challenging in microscope images. The "true" underlying structure is blurred due to the resolution limits imposed by light microscopy. Further, the specific brightness and contrast settings used to examine the image can be misleading, enhancing the effect of the blurring. The inventors' visual assessment of a relatively accurate boundary for this set of intracellular structures incorporated the inventors' experience and knowledge of the extent to which the inventors' specific imaging setup blurred the underlying structure and was applied consistently throughout all structure segmentation workflows.

Figure 2:
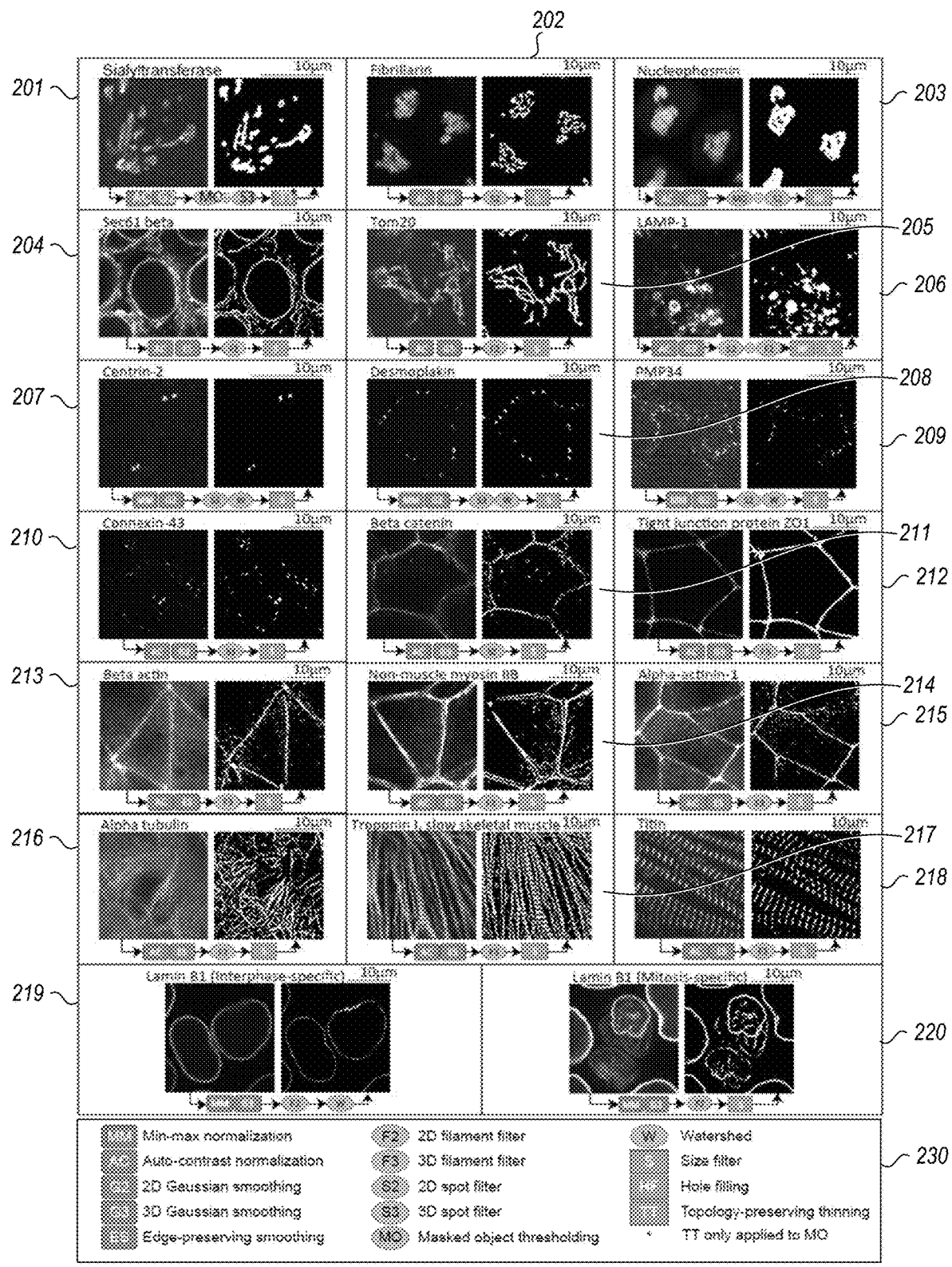
FIG. 2 is a segmentation result diagram that shows the results of applying the workflow and these validation criteria for 20 types of cell structures, including an indication of the classic workflow steps taken by the facility for each of these cell structure types.

FIG. 2 is a segmentation result diagram that shows the results of applying the workflow and these validation criteria for 20 types of cell structures, including an indication of the classic workflow steps taken by the facility for each of these cell structure types. Examples 201-218 consist of image from one tagged protein representing the localization pattern. Examples 219 and 220 are both Lamin B1 images, but from interphase and mitotic stages of the cell cycle, each one representing a distinct localization pattern requiring a separate segmentation workflow. Each boxed region contains a pair of images with the original image on the left and the result of the classic image segmentation workflow on the right. Along the bottom of each pair of images is a diagram of the workflow steps for that workflow, the symbols used in which are the subject of key 230. All images presented here are single slices from a 3D z-stack of images available online at allencell.org/segmenter. Within the workflow diagram, arrows between different colored symbols represent transitions between the three different classic image segmentation workflow steps (pre-processing, core segmentation, and/or post processing). Within each workflow step, two symbols directly adjacent to each other represent that the algorithms were applied sequentially, while the o+symbol represents combining the results from both algorithms. The asterisk within the TT symbol for the Sialyltransferase workflow indicates that the topology-preserving thinning was only applied to the results from the masked object thresholding algorithm. The target result for LAMP1 includes filling the larger lysosomes as the protein LAMP1 labels the membrane of the lysosomes, but the target structure to detect is each entire lysosome.

The same series of choices from each of the 3 workflow steps resulted in successful segmentation for that structure. However, the inventors found that even for similar structures using the same 3 steps (such as MYH10 and ACTN1), the parameter values for the best result still varied. The facility thus in some embodiments uses a "structure look-up table" to serve as a guide for which algorithms and what starting set of parameters may work for a user's segmentation task. In some embodiments, the toolkit includes Jupyter notebooks for each structure for rapid reference and modification.

In some embodiments, the facility performs the classic workflow in accordance with some or all of the code available at github.com/AllenInstitute/aics-segmentation, which is hereby incorporated by reference in its entirety.

Iterative Deep Learning Using Human Contributions

The role of the iterative deep learning workflow is to further boost the segmentation quality whenever the output from the classic image segmentation workflow needs to be improved. The whole iterative deep leaning workflow is built on the concept of "iteration on segmentation results." Suppose one already has some segmentation results of a set of images (either from the classic image segmentation workflow, a different deep learning model, or an earlier epoch of the facility's deep learning model). The results are acceptable for certain images or certain regions in images, but are not completely satisfactory. In some embodiments, the facility uses either or both of two human-in-the-loop strategies—sorting and merging—to prepare the ground truth for the next round of model training. In some embodiments, these human intervention strategies do not involve any manual painting of the structure. One objective is to impose human knowledge into ground truth in an efficient way, without tedious complete manual painting.

In some embodiments, the iterative deep learning workflow is implemented in an easily accessible way and with minimal tunable parameters. Specifically, in some embodiments, the usage is simplified into putting raw images and training ground truth in the same folder following certain naming convention and setting a few parameters according to prior knowledge in biology about the structure. In some embodiments, all the details about building models, setting hyper-parameters, training the model, and so on, are handled automatically in a way that designed and tested for this type of 3D microscopy images.

Two common scenarios where the classic image segmentation workflow may not produce satisfactory segmentations are image-to-image variations or cell-to-cell variations in segmentation accuracy. Image-to-image variation occurs when the segmentation is accurate only on some image stacks and not others, which can be due to both biological and microscopy imaging conditions. For example, if a given structure behaves slightly differently for cells imaged in the center of an hiPSC colony vs near the edge of the colony, then there is no reason that one segmentation algorithm will perform equally well in both cases. To address this case, the first form of human input used by the facility in iteratively training its deep learning network is sorting: in order to generate a ground truth image set, the facility prompts a human user to sort segmented images into successful vs. unsuccessful segmentations, and only uses the successfully segmented images for model training. The subsequent model may end up more robust to image-to-image variation as more contextual knowledge is learned by the deep learning model.

Figure 3:
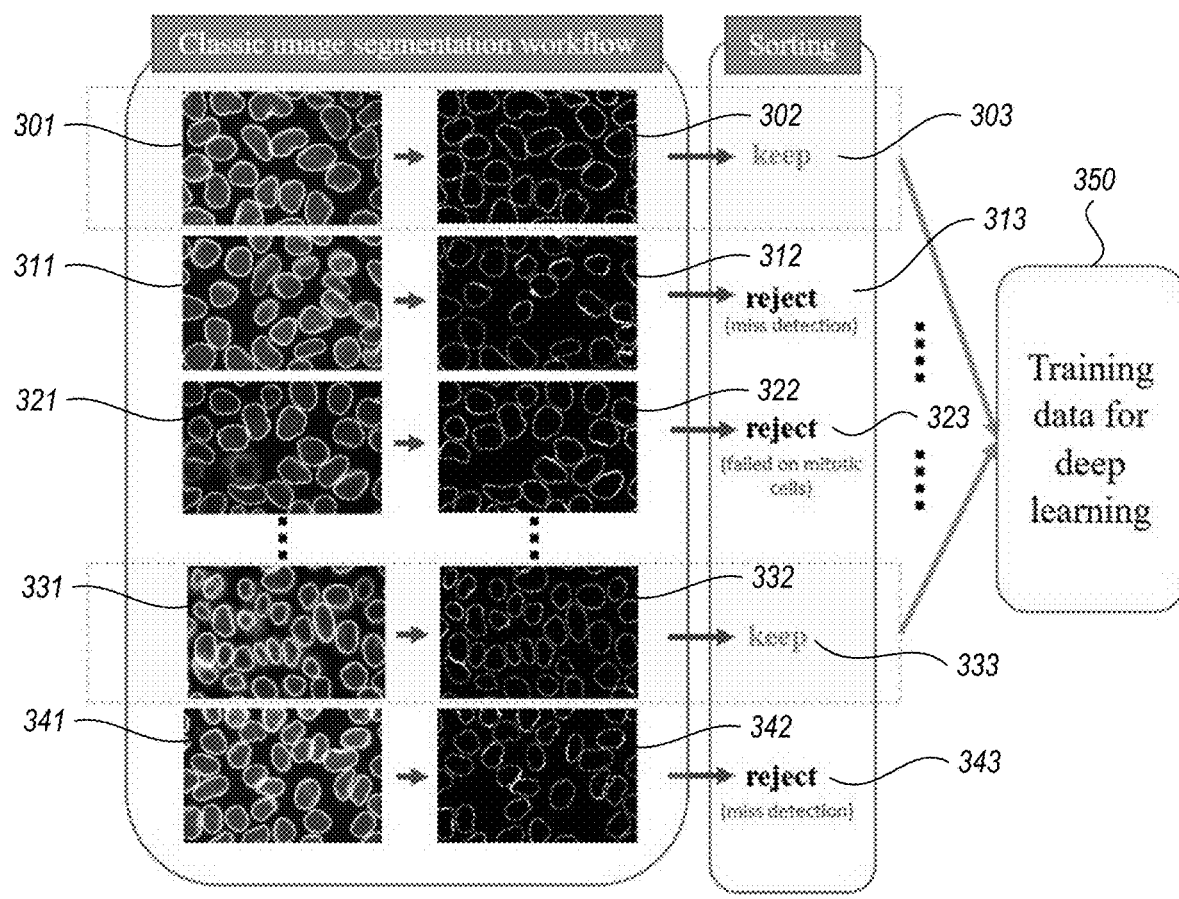
FIG. 3 is a process diagram showing sample results of the sorting process.

FIG. 3 is a process diagram showing sample results of the sorting process. The process diagram shows segmenting results 302, 312, 322, 332, and 342 produced by the classic image segmentation workflow for source images 301, 311, 321, 331, and 341, respectively. The sorting vector indicates to keep segmentation result 302 produced from source image 301 and segmentation result 332 from source image 331. These two classic segmentations are used as training data 350 for deep learning, and the other three are not.

On the other hand, an example of a source for cell-to-cell variation in segmentation accuracy is an image containing multiple cells that express different amounts of the tagged protein, such as a protein or structure that changes morphology or intensity significantly throughout the cell cycle. In this case, two slightly different sets of segmentation parameters might permit both versions of the structure to be well-segmented, but both sets of parameters can normally not be applied to the same image. Here, the facility uses the second form of human input used by the facility in iteratively training its deep learning network: merging, in which the facility prompts a human user to select different portions of a segmentation result for the application of different parameter sets. For example, in some embodiments, the facility uses a simple image editing tool, such as those available through ImageJ or ITK-SNAP, to permit the user to manually circle and mask specific areas within a field of image and applying the two different parameter sets to each, then merging the results permits one single ground truth for that image.

Figure 4:
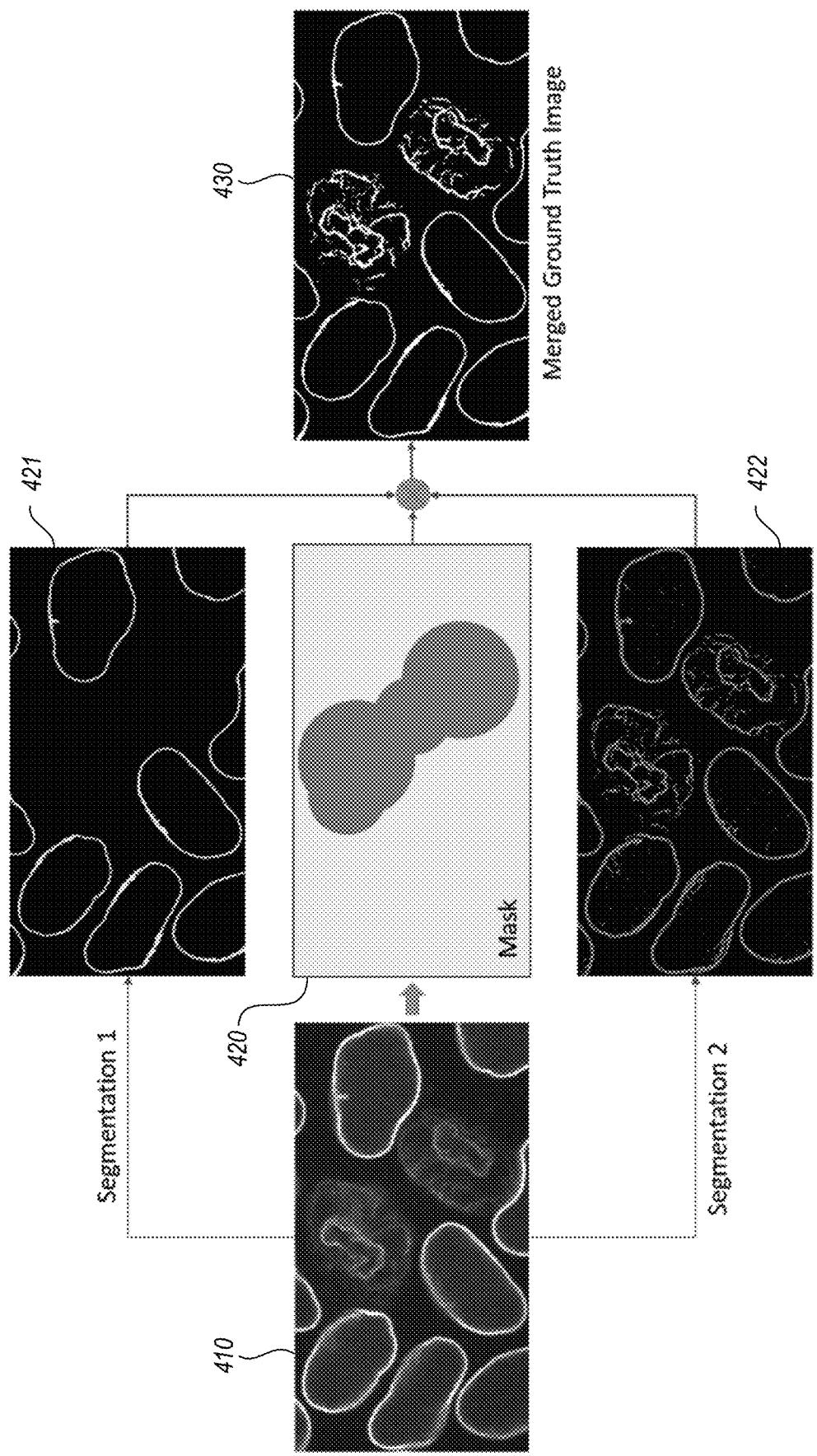
FIG. 4 is a data flow diagram showing a first example in which the facility performs merging.

FIG. 4 is a data flow diagram showing a first example in which the facility performs merging. In particular, in the example shown in FIG. 4, two different classic image segmentation workflows were applied to the same Lamin B1 image 410. Classic segmentation 1 produced segmentation result 421, which worked well on interphase Lam in B1 localization patterns. Segmentation 2 produced segmentation result 422, which worked better on mitotic Lam in B1 localization patterns. A mask 420 made up of four circles with two different radii was manually created in Fiji with the "PaintBrush" tool. The facility uses the mask as a basis for merging the two segmentation results to obtain a single ground truth segmentation result 430. The facility did this by taking the segmentation displayed in yellow within the yellow area, and taking the segmentation displayed in green within the green area on the mask. This merged ground truth image becomes part of the 3D deep learning training set.

Figure 5:
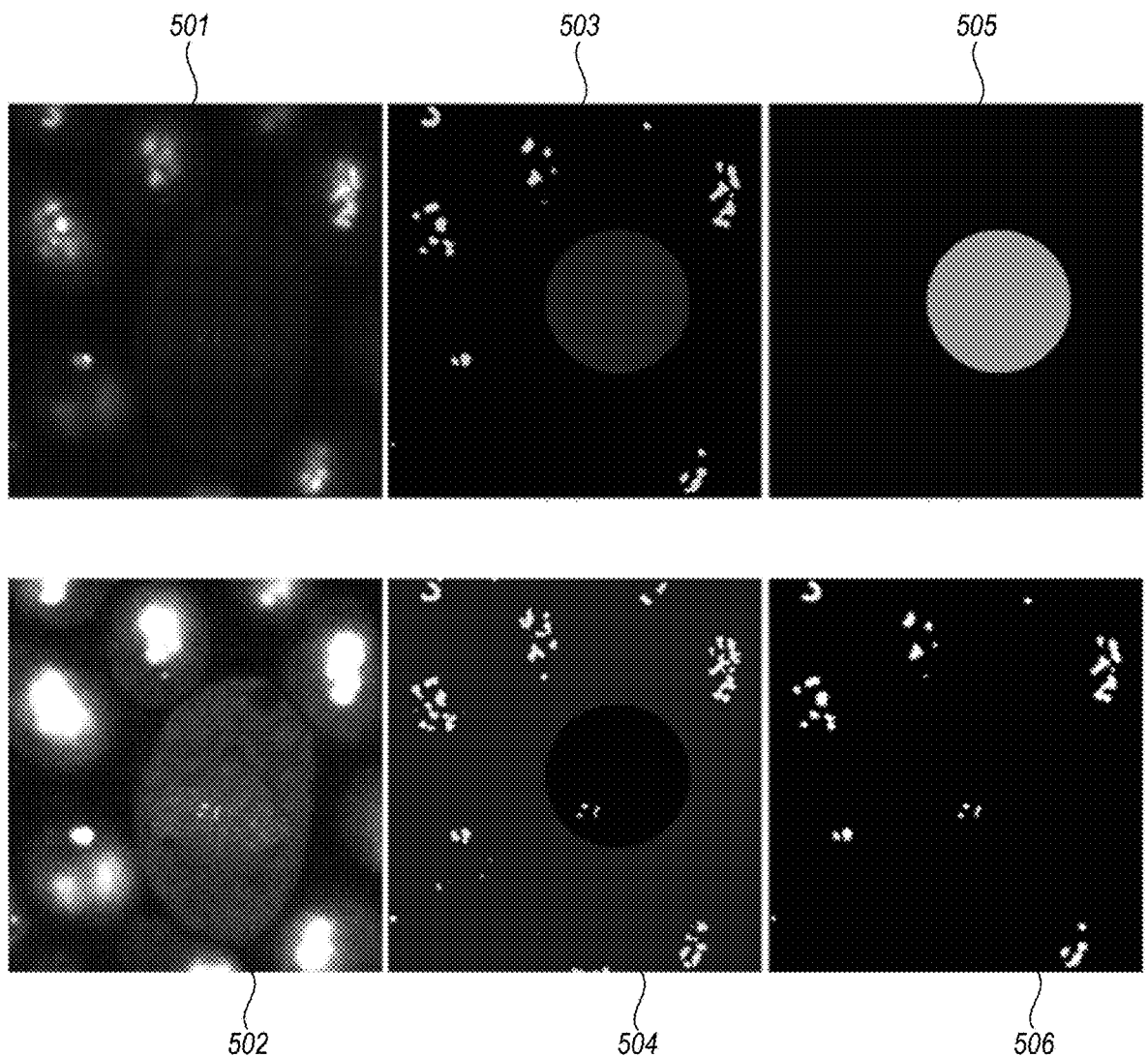
FIG. 5 is an image diagram showing a second example of merging performed by the facility.

FIG. 5 is an image diagram showing a second example of merging performed by the facility. A first segmentation technique generates segmentation result 503, while a second segmentation technique generates a segmentation result 504. The user defines the mask shown in image 505, which is used as a basis for the facility to merge segmentation results 503 and 504 into single segmentation result 506.

Figure 6:
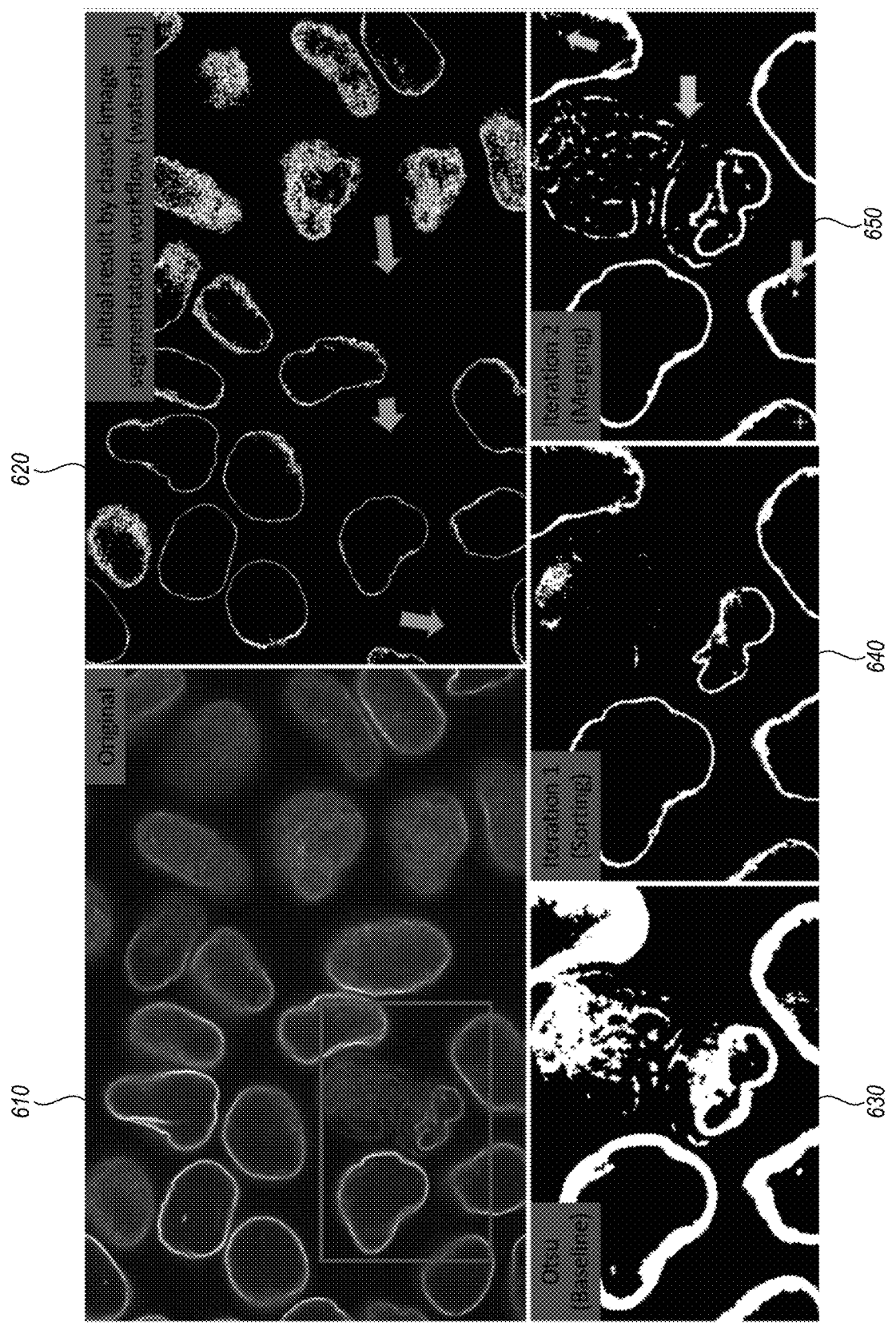
FIG. 6 is an image diagram that shows sample results produced by the facilities using both sorting and merging.

FIG. 6 is an image diagram that shows sample results produced by the facilities using both sorting and merging. In particular, image 610 represents a middle z-slice from the original Lam in B1 image, with a Lam in B1 mitotic localization pattern shown in a red rectangle. Segmentation result 630 shows the result of a standard Otsu thresholding segmentation as a baseline. Image 630 shows the Segmenter classic image segmentation workflow result. Segmentation result 640 shows the result after the first iteration of the deep learning model trained by a ground truth set generated by sorting. Segmentation result 650 shows the result after the second iteration of the deep learning model trained on a ground truth set generated by merging. The blue arrows in result 620 indicate an interphase Lam in B1 localization pattern that was originally missing in the classic image segmentation workflow but was detected using the iterative deep learning models. The yellow arrows in segmentation result 650 indicate the mitotic Lamin B1 localization pattern that was detected after the second iteration of the deep learning model.

In some embodiments, the deep learning models employed by the facility are fully convolutional networks, specially customized for 3D microscopy images, such as deeply supervised anisotropic U-Net (DSAU, "Net_basic") and DSAUzoom ("Net_zoom"). These two models have very similar architectures, while DSAU employs large receptive field and is more suitable for structures of relatively larger size. Net_basic is a variant of a 3D U-Net with (1) max pooling in all xyz dimensions replaced by max pooling in xy only, (2) zeros padding removed from all 3D convolution and (3) auxiliary loss added for deep supervision. Net_zoom has a similar architecture to Net_basic, but with an extra pooling layer with variable ratio to further enlarge the effective receptive field. Such modifications are made to deal with anisotropic dimensions common in 3D microscopy images and to improve the performance in segmenting tenuous structures, such as the thin nuclear envelope.

Figure 7:
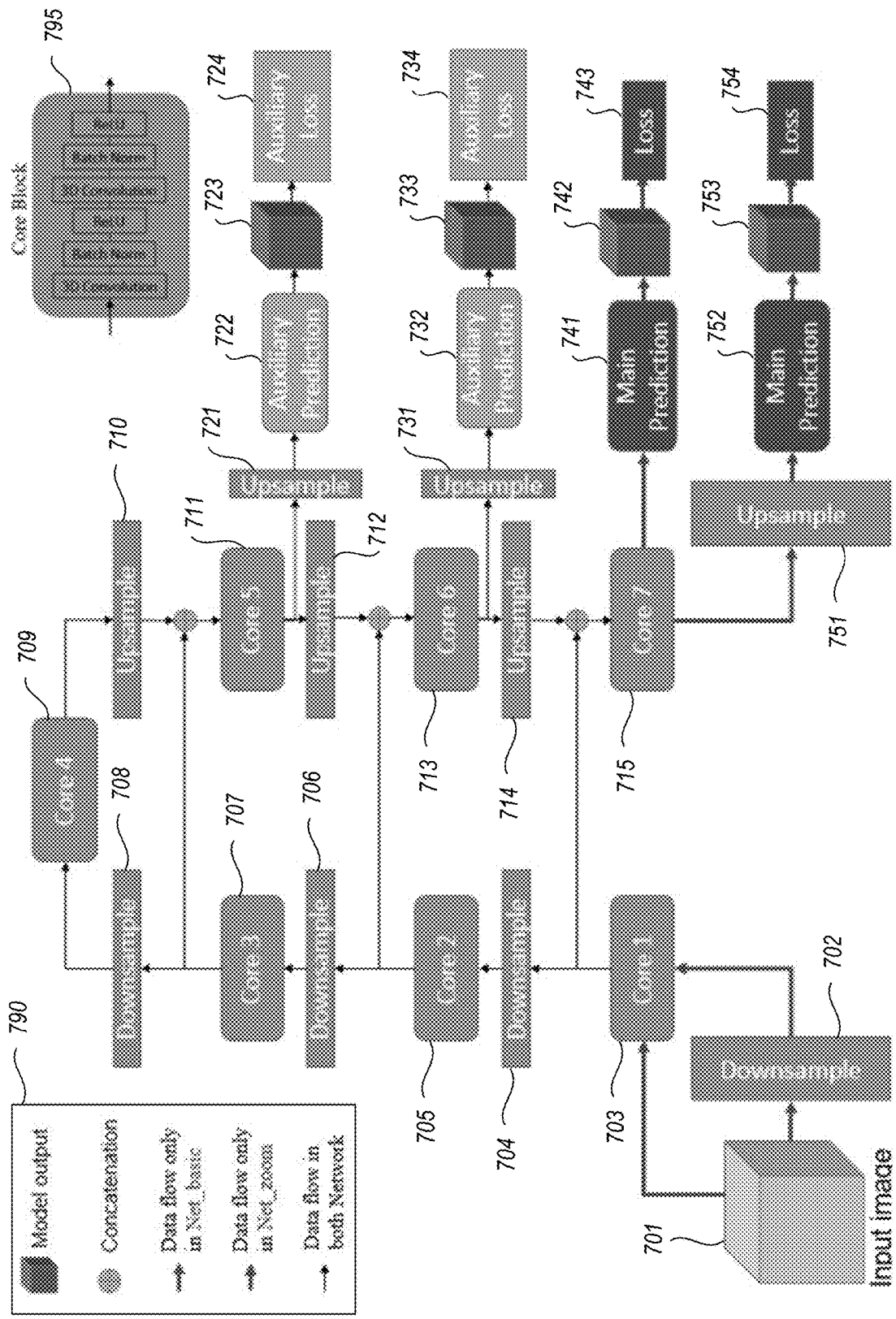
FIG. 7 is a network architecture diagram that shows the architecture of the two deep neural networks used in the iterative deep learning workflow in some embodiments.

FIG. 7 is a network architecture diagram that shows the architecture of the two deep neural networks used in the iterative deep learning workflow in some embodiments. The two networks, Net_basic and Net_zoom, are very similar in architecture. The layers and data flows that differ between Net_basic and Net_zoom are marked in purple and red, respectively, as set forth in key 790. In some embodiments, the network consists of 7 core blocks 703, 705, 707, 709, 711, 713, and 715 connected by downsampling and upsampling layers. All core blocks have the same layers, detailed in core block detail box 795. In some embodiments, each core block contains two consecutive sets of 3D Convolution with kernel size 3, batch normalization and ReLU activation. In some embodiments, both networks are attached to one main prediction branch and two auxiliary prediction branches. In some embodiments, the main prediction block is one 3D convolution with kernel size 1, while auxiliary blocks have one 3D convolution with kernel size 3, followed by another 3D convolution with kernel size 1.

In each training iteration, random data augmentation is applied on each image, and a batch of sample patches are randomly cropped from the augmented images. In some embodiments, the patch size (i.e., the size of model input) and batch size (i.e., the number of samples trained simultaneously in each iteration) depend on the available GPU memory. For example, a single Nvidia GeForce GPU with 12 GB memory is used in some of the inventors' experiments. With this hardware, the facility uses a batch size of 4 and each input sample patch has size 140×140×44 voxels for Net_basic and 420×420×72 voxels for Net_zoom. For data augmentation, in some embodiments, the facility uses a random rotation by 8 (a random value from 0 to Tr) and a random horizontal flip with probability 0.5.

The architecture and use of U-Nets is described in Ronneberger O., Fischer P., Brox T. (2015) U-Net: Convolutional Networks for Biomedical Image Segmentation, In: Navab N., Hornegger J., Wells W., Frangi A. (eds) Medical Image Computing and Computer-Assisted Intervention—MICCAI 2015, MICCAI 2015, Lecture Notes in Computer Science, vol 9351, Springer, Cham, which is hereby incorporated by reference in its entirety. Weighted cross-entropy is used in all the loss functions, where a per-voxel weight is taken as a separate input image (i.e., cost map). By default, the facility uses a weight=1 for all voxels, but can assign a larger weight on those extremely critical regions or assign zeros to those regions that do not count for the loss function. In some embodiments, models are trained with Adam with constant learning rate 0.00001 and 0.005 as the weight for L2 regularization. In each training iteration, a batch of samples are randomly cropped from the image. The sample patch size and batch size depend on the available GPU memory.

In some embodiments, the facility uses U-Nets with a variety of kinds of customization. For example, in some cases, the U-Net performs loss analysis at various points along its expansive path. In some embodiments, the U-Net used by the facility is configurable to adjust the effective resolution in the Z axis relative to the effective resolution in the X and Y axes. Those skilled in the art will appreciate that further modifications to the U-Net used by the facility may in some cases produce better results.

In some embodiments, the facility performs the deep-learning workflow in accordance with some or all of the code available at github.com/AllenInstitute/aics-ml-segmentation, which is hereby incorporated by reference in its entirety.

In some embodiments, the facility addresses a blurring of the boundaries of the structure that arises from the resolution limits of fluorescence microscopy. Depending on both the contrast setting of the image and the parameters of a given segmentation algorithm, the resultant binary image can vary significantly.

Figure 8:
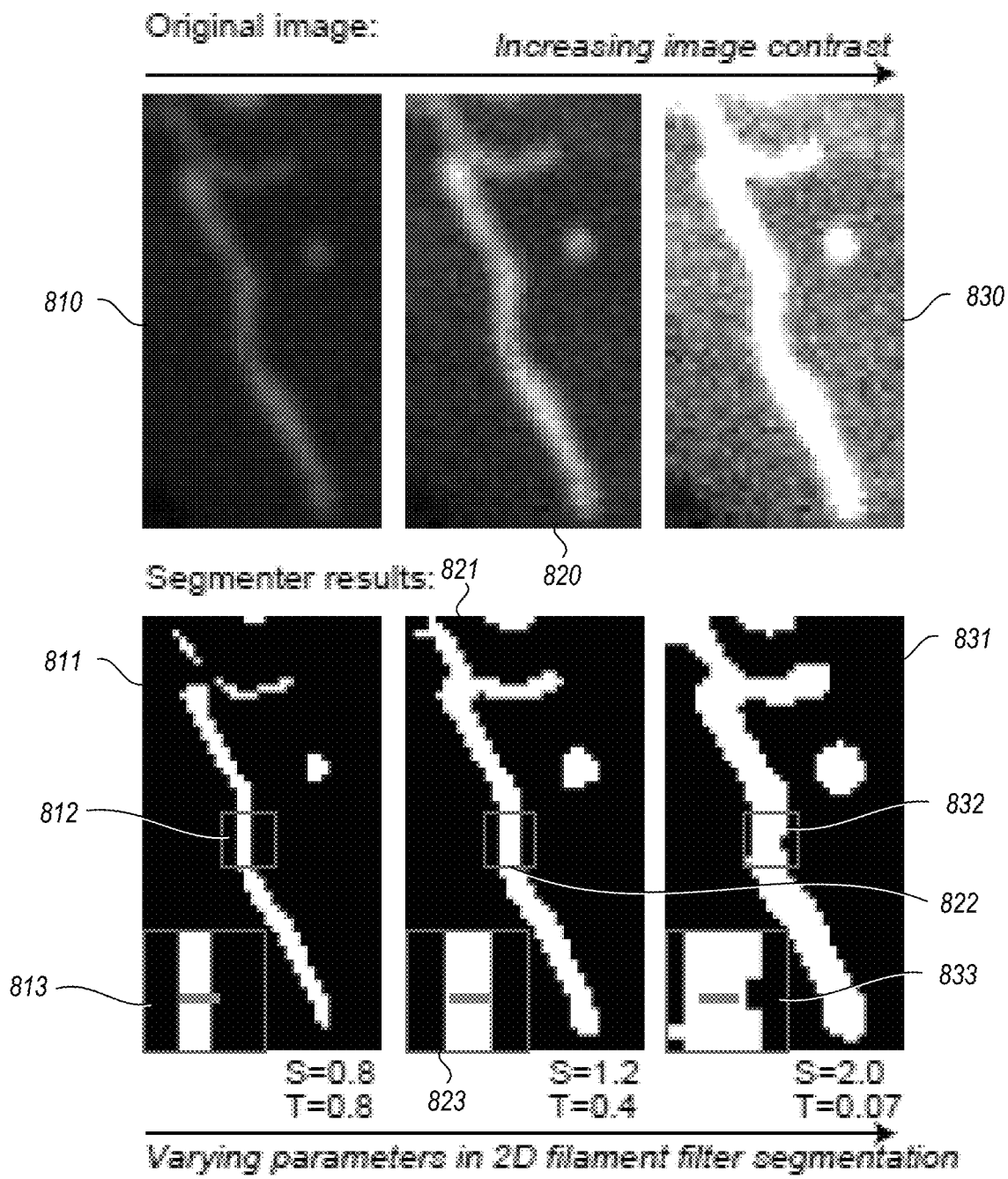
FIG. 8 is an image diagram showing sample segmentation results for a mitochondrial tubule produced by the facility in some embodiments using varying segmentation parameters, which result in segmented tubules of varying width.

FIG. 8 is an image diagram showing sample segmentation results for a mitochondrial tubule produced by the facility in some embodiments using varying segmentation parameters, which result in segmented tubules of varying width. To identify a consistent target for detecting boundaries of the many different tagged intracellular structures, the effect is shown of different segmentation parameters on the segmentation of mitochondrial tubules marked with a matrix-targeted mCherry in transiently transfected hiPS cells. Images 810, 820, and 830 show the same tubule with increasing brightness and contrast settings from image 810 to image 830 for visualization purposes only. Images 811, 821, and 831 show the result of increasing the kernel size parameter (S) while decreasing the threshold parameter (T) in the 2D filament filter segmentation algorithm, which was applied to this image. The brightness and contrast settings in images 810, 820, and 830 are set to match the segmentation results in images 811, 821, and 831 to demonstrate that each of the segmentation results are reasonable given the input image. Magnified areas 813, 823, and 833 correspond to portions 812, 822, and 832 of images 811, 821, and 831, respectively. The green line segments within magnified areas 813, 823, and 833 is 260 nm long, the diameter of mitochondria based on EM images of human stem cells. Image 821 and corresponding magnified area 823 represents the segmentation result that the collection of classic image segmentation workflows in the look-up table seeks to consistently target for each intracellular structure localization pattern.

To establish a consistent baseline of how to detect the blurred boundary, in some embodiments the facility uses a fluorescently tagged mitochondrial matrix marker as a test structure, and selects the segmentation parameter that most closely matches EM-based measurements of mitochondria in human stem. The facility then uses the resultant combination of contrast settings and object boundary setting as a consistent target for the creation of the other intracellular structure segmentation workflows.

Figure 9:
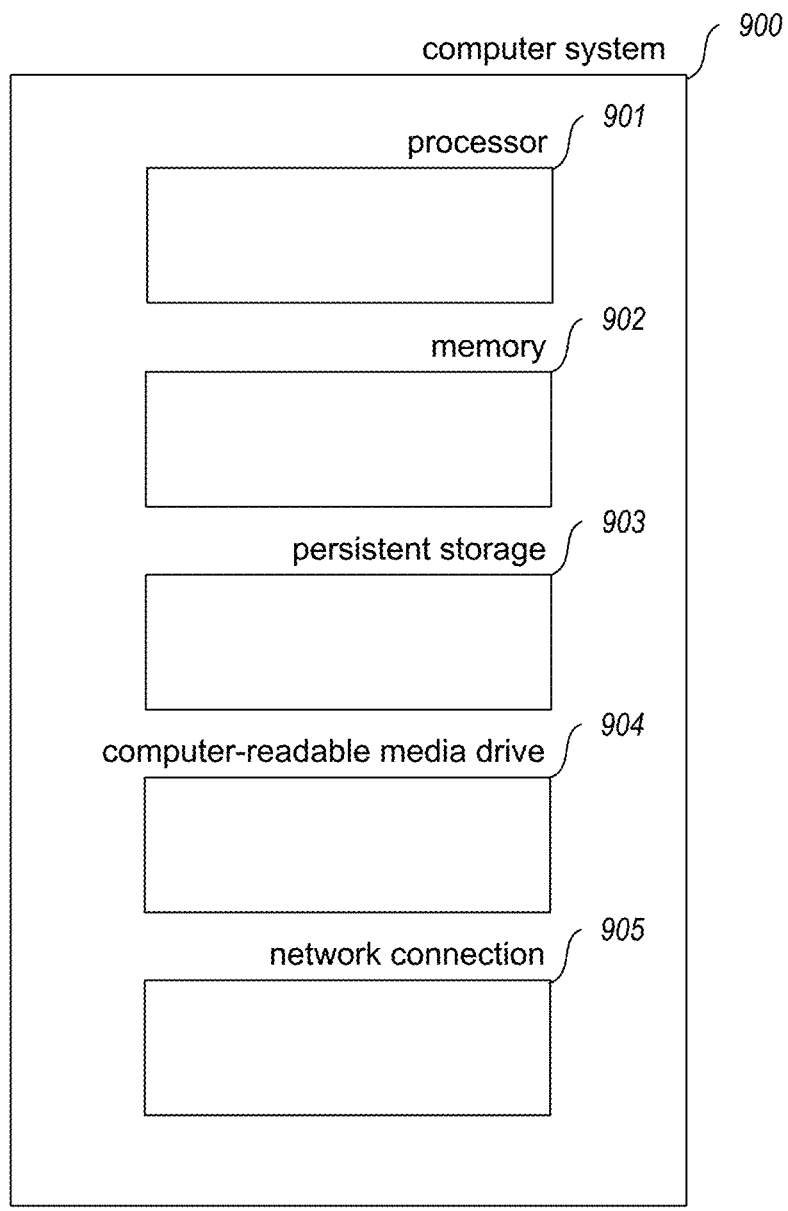
FIG. 9 is a block diagram showing some of the components typically incorporated in at least some of the computer systems and other devices on which the facility operates.

The inventors determined mitochondrial widths in human pluripotent stem cells and human embryonic stem cells using previously published EM images. JPEG versions of the EM images obtained from the manuscripts were opened in FiJi and mitochondrial width was measured for 5-10 mitochondria per EM image. A line was manually drawn between the outer mitochondrial membranes along the smaller mitochondrial axis. Line lengths were measured and converted into nanometers using the original scale bars in the figures. Mitochondrial width was found to be 256+/−22 nm for human pluripotent stem cells and 265+/−34 nm for human embryonic stem cells (mean+/−95% confidence interval). An average mitochondrial width of 260 nm was therefore used in FIG. 8. FIG. 9 is a block diagram showing some of the components typically incorporated in at least some of the computer systems and other devices on which the facility operates. In various embodiments, these computer systems and other devices 900 can include server computer systems, desktop computer systems, laptop computer systems, cloud computing platforms for virtual machines in other configurations, netbooks, tablets, mobile phones, personal digital assistants, televisions, cameras, automobile computers, electronic media players, smart watches and other wearable computing devices, etc. In various embodiments, the computer systems and devices include one or more of each of the following: a central processing unit ("CPU"), graphics processing unit ("GPU"), or other processor 901 for executing computer programs; a computer memory 902 for storing programs and data while they are being used, including the facility and associated data, an operating system including a kernel, and device drivers; a persistent storage device 903, such as a hard drive or flash drive for persistently storing programs and data; a computer-readable media drive 904, such as a floppy, CD- ROM, or DVD drive, for reading programs and data stored on a computer-readable medium; and a network connection 905 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components. In various embodiments, the computing system or other device also has some or all of the following hardware components: a display usable to present visual information to a user; one or more touchscreen sensors arranged with the display to detect a user's touch interactions with the display; a pointing device such as a mouse, trackpad, or trackball that can be used by a user to perform gestures and/or interactions with displayed visual content; an image sensor, light sensor, and/or proximity sensor that can be used to detect a user's gestures performed nearby the device; and a battery or other self-contained source of electrical energy that enables the device to operate while in motion, or while otherwise not connected to an external source of electrical energy.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method in a computing system for identifying boundaries of 3-dimensional structures in 3-dimensional images, comprising:
    for each of a plurality of 3-dimensional images,
        receiving results of a first attempt to identify boundaries of structures in the 3-dimensional image by applying a sequence of one or more procedural segmentation measures;
        causing the results of the first attempt to be presented to a person;
        receiving input generated by the person providing feedback on the results of the first attempt;
    using the following to train a deep-learning network to identify boundaries of 3-dimensional structures in 3-dimensional images: at least a portion of the plurality of 3-dimensional images, at least a portion of the received results, and at least a portion of provided feedback;
    receiving a distinguished 3-dimensional image not among the plurality of 3-dimensional images;
    applying the trained deep-learning network to the distinguished 3-dimensional image to obtain a segmentation result for the distinguished 3-dimensional image; and
    storing the obtained segmentation result for the distinguished 3-dimensional image, wherein the feedback approves the results of the first attempt for a first proper subset of the plurality of 3-dimensional images and rejects the results of the first attempt for a second proper subset of the plurality of 3-dimensional images.

2. The method of claim 1 wherein the structures are organelles in a biological cell.

3. The method of claim 1 wherein, for each of at least one of the plurality of 3-dimensional images, the feedback subdivides the results into two or more regions in which structure boundaries should be identified independently.

4. The method of claim 1 wherein the deep-learning network is one or more artificial neural networks.

5. The method of claim 1 wherein the deep-learning network is a U-net variant.

6. The method of claim 1 wherein each 3-dimensional image is represented by a stack of 2-dimensional images.

7. A non-transitory computer-readable medium having contents configured to cause a computing system to perform a method in a computing system for identifying boundaries of 3-dimensional structures in 3-dimensional images, the method comprising:
    for each of a plurality of 3-dimensional images,
        receiving results of a first attempt to identify boundaries of structures in the 3-dimensional image by applying a sequence of one or more procedural segmentation measures;
        causing the results of the first attempt to be presented to a person;
        receiving input generated by the person providing feedback on the results of the first attempt;
    using the following to train a deep-learning network to identify boundaries of 3-dimensional structures in 3-dimensional images: at least a portion of the plurality of 3-dimensional images, at least a portion of the received results, and at least a portion of provided feedback;
    receiving a distinguished 3-dimensional image not among the plurality of 3-dimensional images;
    applying the trained deep-learning network to the distinguished 3-dimensional image to obtain a segmentation result for the distinguished 3-dimensional image; and
    storing the obtained segmentation result for the distinguished 3-dimensional image, wherein the feedback approves the results of the first attempt for a first proper subset of the plurality of 3-dimensional images and rejects the results of the first attempt for a second proper subset of the plurality of 3-dimensional images.

8. The non-transitory computer-readable medium of claim 7 wherein the structures are organelles in a biological cell.

9. The non-transitory computer-readable medium of claim 7 wherein, for each of at least one of the plurality of 3-dimensional images, the feedback subdivides the results into two or more regions in which structure boundaries should be identified independently.

10. The non-transitory computer-readable media medium of claim 7 wherein the deep-learning network is a sequence of artificial neural networks.

11. The non-transitory computer-readable medium of claim 7 wherein the deep-learning network is a U-net variant.

12. The non-transitory computer-readable medium of claim 7 wherein each 3-dimensional image is represented by a stack of 2-dimensional images.

13. A computing system, comprising:
    at least one processor; and a memory having contents configured to cause the at least one processor to perform a method for identifying boundaries of 3-dimensional structures in 3-dimensional images, the method comprising:
for each of a plurality of 3-dimensional images,
receiving results of a first attempt to identify boundaries of structures in the 3-dimensional image by applying a sequence of one or more procedural segmentation measures;
causing the results of the first attempt to be presented to a person;
receiving input generated by the person providing feedback on the results of the first attempt;
using the following to train a deep-learning network to identify boundaries of 3-dimensional structures in 3-dimensional images: at least a portion of the plurality of 3-dimensional images, at least a portion of the received results, and at least a portion of provided feedback;
receiving a distinguished 3-dimensional image not among the plurality of 3-dimensional images;
applying the trained deep-learning network to the distinguished 3-dimensional image to obtain a segmentation result for the distinguished 3-dimensional image; and
storing the obtained segmentation result for the distinguished 3-dimensional image,
wherein the feedback approves the results of the first attempt for a first proper subset of the plurality of 3-dimensional images and rejects the results of the first attempt for a second proper subset of the plurality of 3-dimensional images.

14. The computing system of claim 13 wherein the structures are organelles in a biological cell.

15. The computing system of claim 13 wherein, for each of at least one of the plurality of 3-dimensional images, the feedback subdivides the results into two or more regions in which structure boundaries should be identified independently.

16. The computing system of claim 13 wherein the deep-learning network is one or more artificial neural networks.

17. The computing system of claim 13 wherein the deep-learning network is a U-net variant.

18. The computing system of claim 13 wherein each 3-dimensional image is represented by a stack of 2-dimensional images.

* * * * *